United States Patent
Kim et al.

(10) Patent No.: US 8,689,916 B2
(45) Date of Patent: Apr. 8, 2014

(54) APPARATUS OF DRIVING WHEELS FOR IN-WHEEL SYSTEM

(75) Inventors: Changsung Sean Kim, Suwon (KR); Jang Hyeok Won, Suwon (KR); Han Kyung Bae, Seongnam-si (KR); Yong Wan Cho, Suwon (KR); Jin Su Seok, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 95 days.

(21) Appl. No.: 13/405,802

(22) Filed: Feb. 27, 2012

(65) Prior Publication Data

US 2013/0106168 A1 May 2, 2013

(30) Foreign Application Priority Data

Oct. 28, 2011 (KR) ................. 10-2011-0110898

(51) Int. Cl.
*B60K 7/00* (2006.01)

(52) U.S. Cl.
USPC ........................ 180/65.51; 310/114

(58) Field of Classification Search
USPC ............... 180/165, 65.1, 65.51, 65.6; 310/64, 310/114, 126; 903/906
See application file for complete search history.

(56) References Cited

U.S. PATENT DOCUMENTS

| | | | |
|---|---|---|---|
| 3,055,448 A * | 9/1962 | Fagel ............................... 180/10 |
| 3,892,300 A * | 7/1975 | Hapeman et al. ........... 180/65.51 |
| 4,330,045 A * | 5/1982 | Myers ......................... 180/65.51 |
| 6,590,312 B1 * | 7/2003 | Seguchi et al. ................ 310/266 |
| 6,998,757 B2 * | 2/2006 | Seguchi et al. ................ 310/266 |
| 7,119,468 B2 * | 10/2006 | Shkondin ...................... 310/114 |
| 7,626,299 B2 * | 12/2009 | Yoshikawa et al. ........... 310/114 |
| 2008/0308330 A1 | 12/2008 | Murata |
| 2013/0106168 A1 * | 5/2013 | Kim et al. ....................... 301/6.5 |

\* cited by examiner

*Primary Examiner* — Frank Vanaman
(74) *Attorney, Agent, or Firm* — Bracewell & Giuliani LLP

(57) ABSTRACT

An apparatus is provided for driving wheels for an in-wheel system, including: a driving shaft which is the center of rotatable driving; a fixation supporter rotatably supporting the driving shaft and coupled to the driving shaft; an in-wheel motor generating rotational power, which is coupled to the inside of a wheel in which a tire is mounted on one driving shaft in a shaft direction of the fixation supporter; and a balancing member formed on the other driving shaft in the shaft direction of the fixation supporter and formed at a position corresponding to the wheel coupled with the in-wheel motor. According to the present invention, an eccentricity phenomenon which is caused due to inclination of a wheel and a motor in one direction of a fixation supporter can be prevented in an apparatus of driving wheels for an in-wheel system.

11 Claims, 9 Drawing Sheets

APPARATUS OF DRIVING WHEELS FOR IN-WHEEL SYSTEM

CROSS REFERENCE TO RELATED APPLICATION

This application claims the benefit of Korean Patent Application No. 10-2011-0110898, filed on Oct. 28, 2011, entitled "Apparatus of Driving Wheels for In-wheel System" which is hereby incorporated by reference in its entirety into this application.

BACKGROUND OF THE INVENTION

1. Technical Field

The present invention relates to an apparatus of driving wheels for an in-wheel system.

2. Description of the Related Art

A hybrid vehicle, a fuel cell vehicle, an electric vehicle, and the like have emerged as an alternative of a known vehicle having a gasoline engine or a diesel engine using fossil fuel. The hybrid vehicle uses both power generated from an internal combustion engine and power generated from an electric motor, while the electric vehicle uses only power generated from the electric motor driven by electric energy of a battery and the fuel cell vehicle uses only power generated from an electric motor driven by electric energy produced from hydrogen.

The in-wheel system as a system in which the electric motor is mounted in not an engine room but wheels and driving force is controlled directly in each wheel is used in the vehicles such as the hybrid vehicle, the fuel cell vehicle, and the electric vehicle using the electric motor as a driving source of the wheel.

The in-wheel system is a system in which a motor is installed in the wheel and power of the motor is transferred directly to the wheel. Various types are provided according to an implementation method and the in-wheel system is classified into a basic type in which only a driving motor is mounted in the wheel to coexist with an existing suspension system which is called a simple in-wheel system and an integrated in-wheel system in which all of brake, steering, suspension systems are mounted in the wheel together with the driving motor.

The simple in-wheel system may be classified into an inner rotor type and an outer rotor type again according to relative positions of a stator and a rotor.

The in-wheel system brings a big change in a vehicle design method and an assembly line. That is, when the in-wheel system is adopted, shapes and functions of engine peripheral parts such as a sub-frame, a vehicle body, and the like supporting an engine based on the engine room will be drastically changed and designed. Further, an in-wheel module manufactured as a module to be mounted in the wheel can be switched to a type that sequentially supplies and assemblies an in-wheel module having an output required by a consumer in a vehicle sub-assembly line. Therefore, an engine driving system which is a core technology of the vehicle is manufactured outside through the in-wheel module to be assembly to the vehicle. From the point of view of a vehicle manufacturer, since the vehicle manufacturer can cooperate with part suppliers by laying emphasis on overall performance objectives and designs of the vehicle, a development cost can be saved and a development risk can be distributed.

However, there is a structural problem for supporting a load because the wheel and the motor are inclined in only one direction of a fixation supporter by adopting the known in-wheel system. Further, driving reliability of the in-wheel system is deteriorated due to the problem to thereby exerting a fatal influence on the driving performance and reliability of the vehicle adopting the in-wheel system.

SUMMARY OF THE INVENTION

The present invention has been made in an effort to provide an apparatus of driving wheels for an in-wheel system for improving reliability of the in-wheel system by a problem depending on eccentricity of a load by integration of a wheel and a motor in a vehicle body structure adopting the in-wheel system and improving overall driving performance by applying a dual motor to an in-wheel motor.

According to a first preferred embodiment of the present invention, there is provided an apparatus of driving wheels for an in-wheel system, including: a driving shaft which is the center of rotatable driving; a fixation supporter rotatably supporting the driving shaft and coupled to the driving shaft; an in-wheel motor coupled to the inside of a wheel having a tire mounted on one driving shaft thereof in a shaft direction of the fixation supporter and generating rotational power; and a balancing member formed on the other driving shaft in the shaft direction of the fixation supporter and formed at a position corresponding to the wheel coupled with the in-wheel motor.

Herein, the balancing member may be configured to have a load which is larger than or equal to the sum of loads of the wheel in which the tire is mounted on one driving shaft in the shaft direction of the fixation supporter and the in-wheel motor coupled to the inside of the wheel.

Further, the balancing member may be configured to be coupled with a controller module controlling the driving of the motor.

The in-wheel motor having a double rotor structure may include: an out-rotor having a plurality of out-rotor salient poles formed at equidistance along an inner circular peripheral surface thereof; an in-rotor received in the out-rotor and having a plurality of in-rotor salient poles formed at equidistance along an outer circular peripheral surface thereof; and a stator core formed between the in-rotor and the out-rotor so as to face each of the in-rotor and the out-rotor, and provided with a plurality of out-stator salient poles each corresponding to the out-rotor salient poles and including a main salient pole, a first auxiliary salient pole, and a second auxiliary salient pole sequentially formed along an outer peripheral surface thereof and a plurality of in-stator salient poles corresponding to the in-rotor salient poles and including a first salient pole and a second salient pole sequentially formed along an inner peripheral surface thereof, and coils may be wound around the main salient pole and, the first salient pole and the second salient pole, respectively.

The first auxiliary salient pole and the second auxiliary salient pole of the out-stator salient pole and the first salient pole and the second salient pole of the in-stator salient pole may be positioned to correspond to each other in opposite directions.

The apparatus of driving wheels for an in-wheel system may further include a supporting material which is filled between the first salient pole and the second salient pole forming the in-stator salient pole and among the plurality of in-stator salient poles.

The supporting material may be made of a non-magnetic body or an insulating material.

The apparatus of driving wheels for an in-wheel system may further include a cooling pipe inserted into the supporting material and placed among the plurality of in-stator salient poles.

The apparatus of driving wheels for an in-wheel system may further include a soundproof material formed among the plurality of out-rotor salient poles which are formed at equidistance.

A peripheral-direction width of the main salient pole forming the out-stator salient pole may be larger than those of the first auxiliary salient pole and the second auxiliary salient pole.

The apparatus of driving wheels for an in-wheel system may further include a magnet inserted into the annular stator core connecting the first salient pole and the second salient pole constituting the in-stator salient pole to each other.

The apparatus of driving wheels for an in-wheel system may further include a motor housing covering an exterior of the in-wheel motor.

DESCRIPTION OF THE PREFERRED EMBODIMENTS

Figure 1:
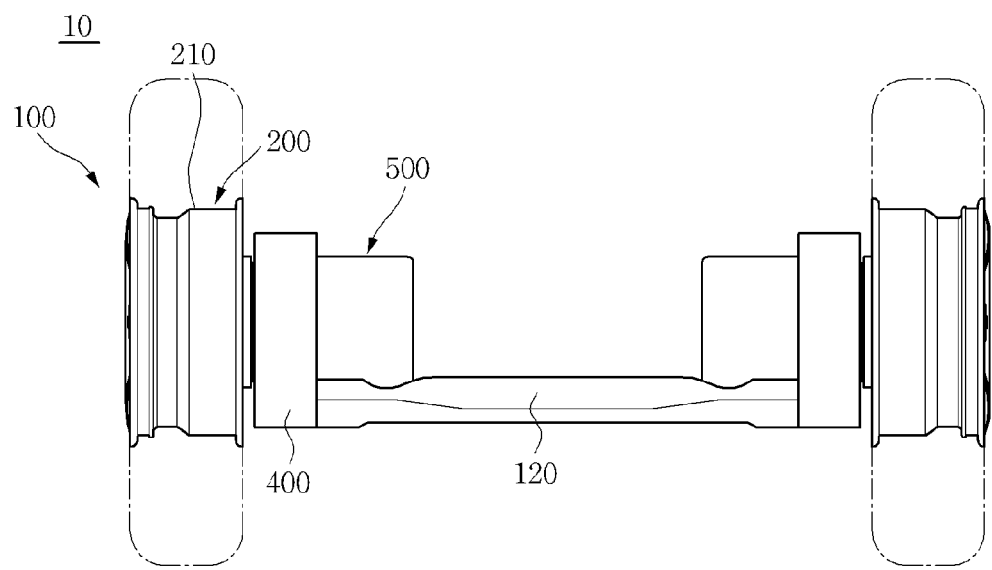
FIG. 1 is a front view of an apparatus of driving wheels for an in-wheel system according to a preferred embodiment.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In addition, the terms "first", "second", "one surface", "the other surface" and so on are used to distinguish one element from another element, and the elements are not defined by the above terms. In the present invention, an "axial direction" refers to a direction in which a shaft corresponding to the rotational center of the motor is formed. In describing the present invention, a detailed description of related known functions or configurations will be omitted so as not to obscure the gist of the present invention.

Hereinafter, preferred embodiments of the present invention will be described in detail with reference to the accompanying drawings.

Figure 2:
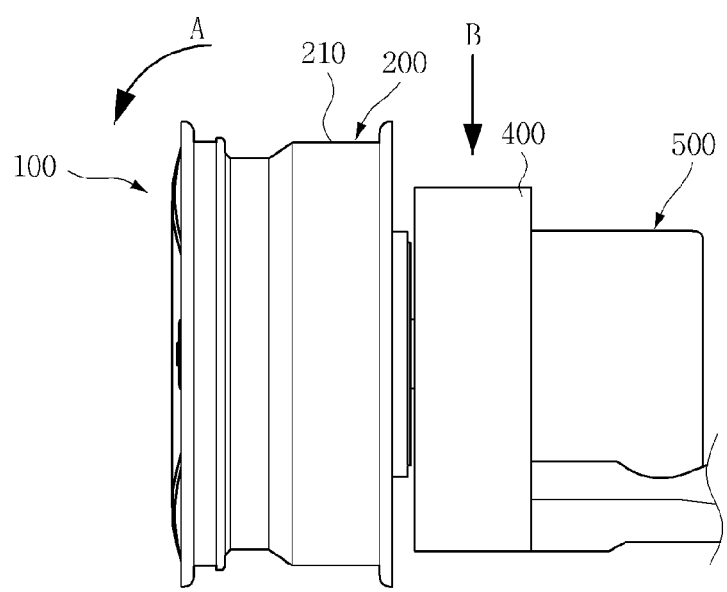
FIG. 2 is a partially enlarged diagram of FIG. 1.
Figure 3A:
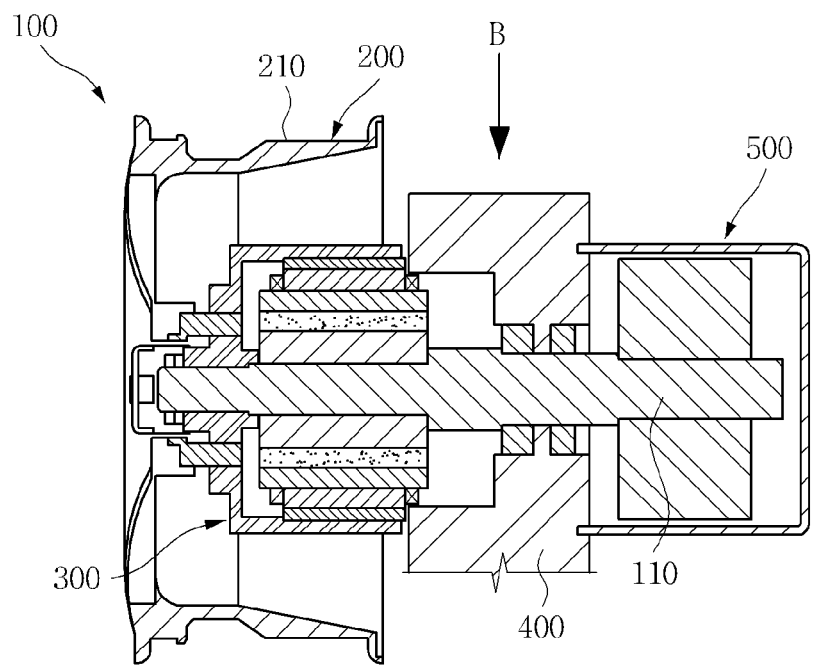
FIGS. 3A and 3B are partial cross-sectional views of the apparatus of driving wheels for an in-wheel system according to the preferred embodiment.
Figure 3B:
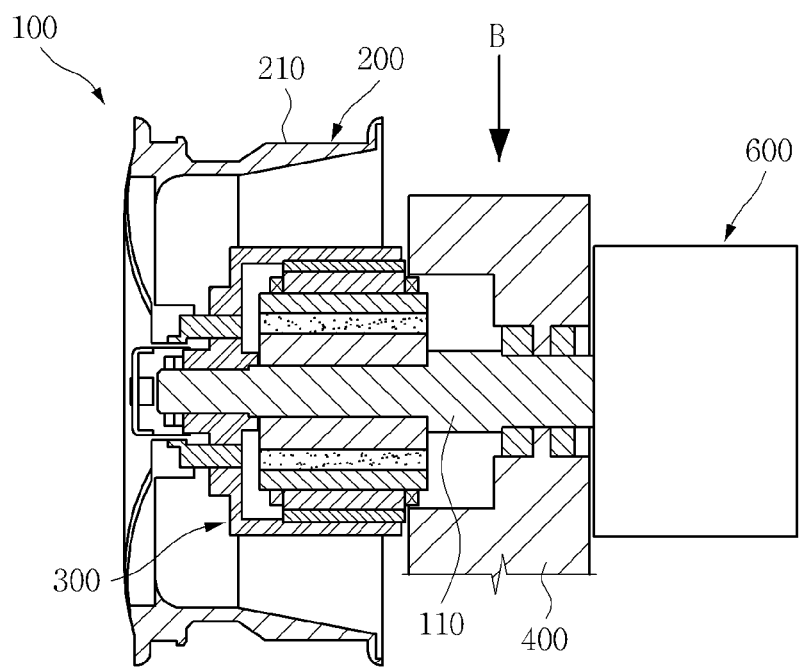
Figure 3C:
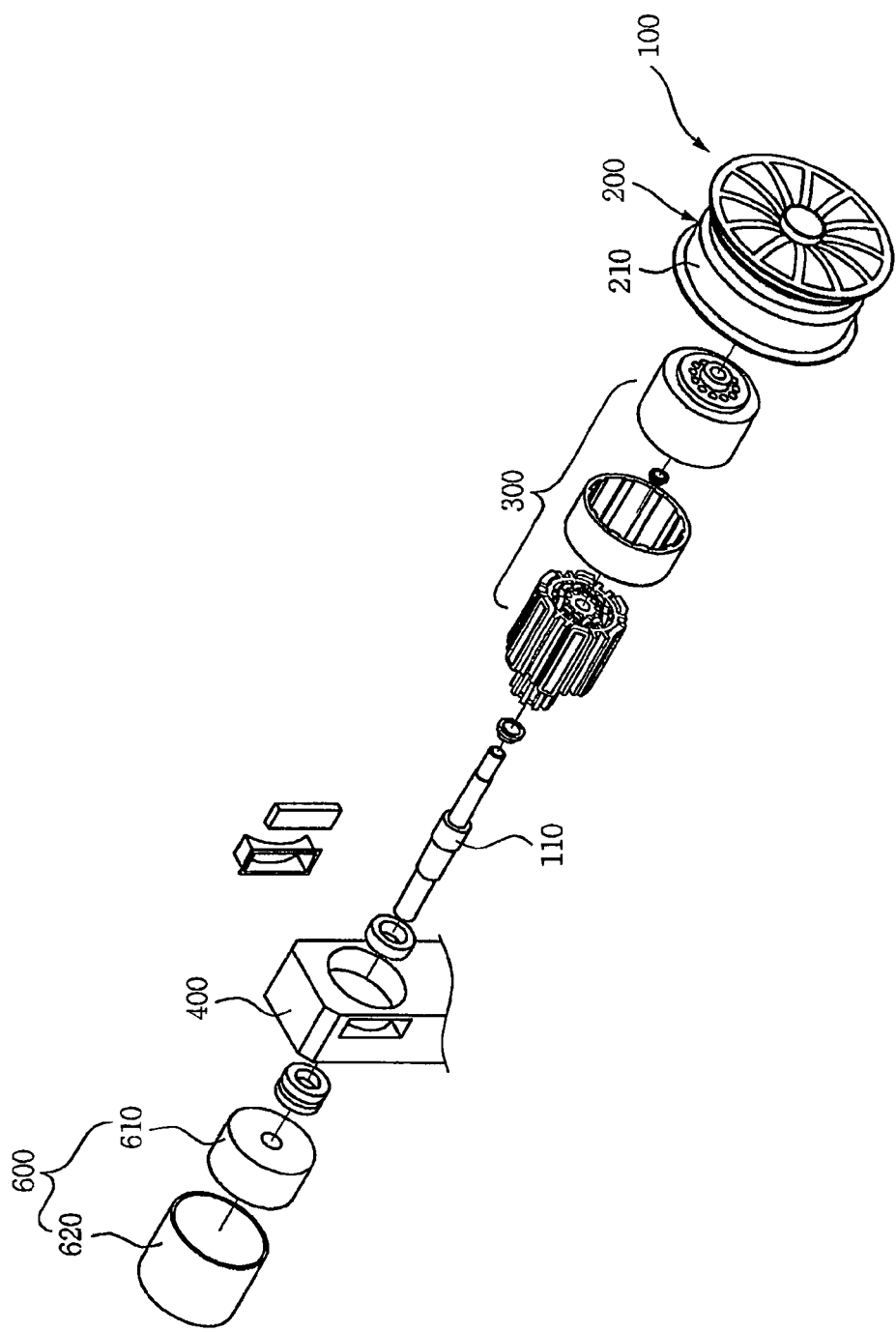
FIG. 3C is a partial exploded perspective view of the apparatus of driving wheels for an in-wheel system according to the preferred embodiment.

FIG. 1 is a front view of an apparatus of driving wheels for an in-wheel system according to a preferred embodiment, FIG. 2 is a partially enlarged diagram of FIG. 1, FIGS. 3A and 3B are partial cross-sectional views of the apparatus of driving wheels for an in-wheel system according to the preferred embodiment, and FIG. 3C is a partial exploded perspective view of the apparatus of driving wheels for an in-wheel system according to the preferred embodiment.

The apparatus 10 of driving wheels for an in-wheel system includes a driving shaft 110 which is the center of rotational driving, a fixation supporter 400 rotatably supporting the driving shaft 110 and coupled to the driving shaft 110, an in-wheel motor 300 coupled to the inside of a wheel 200 having a tire mounted on one driving shaft 110 thereof in a shaft direction of the fixation supporter 400 and generating rotational power, and a balancing member 500 formed on the other driving shaft 110 in the shaft direction of the fixation supporter 400 and formed at a position corresponding to the wheel 200 coupled with the in-wheel motor 300.

The balancing member 500 is configured to have a load which is larger than or equal to the sum of loads of the wheel 1200 in which the tire is mounted on one driving shaft 110 in the shaft direction of the fixation supporter 400 and the in-wheel motor 300 coupled to the inside of the wheel 200.

Further, the balancing member 500 is configured to be coupled with a controller controlling the motor driving.

The driving shaft 110 is a shaft coupled with the in-wheel motor 300 to form a rotational center. As shown in FIG. 3, the driving shaft 110 is supported on the fixation supporter 400 and the wheel 200 mounted with the tire is coupled on an outer part in the shaft direction thereof around a coupling location where the driving shaft 110 is fixed the fixation supporter 400. The in-wheel motor 300 to be described below may be coupled to the inside of the wheel 200. As such, loads of an outer part and an inner part of the coupling location of the driving shaft 110 supported on the fixation supporter 400 are not balanced with each other, and as a result, an eccentricity phenomenon inclined in direction A of FIG. 2 occurs. In the preferred embodiment of the present invention, in order to solve the problem, the balancing member 500 is coupled to the inside in the shaft direction around a coupling location (see a portion of direction B of FIG. 2) of the fixation supporter 400 coupled with the driving shaft 110 and a load of the balancing member 500 is equal to or larger than a load of a wheel assembly 100 mounted with the tire, which includes the in-wheel motor 300 coupled to the outside in the shaft direction (see FIG. 3a). Further, in some cases, a controller module 600 for controlling the driving of the in-wheel motor 300 is coupled to the coupling position of the balancing member 500 to prevent the eccentricity phenomenon to the outside without the additional balancing member 500 (see FIG. 3b). Of course, the balancing member 500 and the controller module 600 may be coupled with each other. As shown in FIG. 3c, the controller module 600 including a controller unit 610 is coupled to a housing 620 in one direction of the fixation supporter 400 and the wheel assembly 100 including the in-wheel motor 300 is coupled in the other direction of the fixation supporter 400. Herein, a load of the controller module 600 is larger than or at least equal to that of the in-wheel assembly 100 mounted with the tire to prevent the eccentricity phenomenon in direction A of FIG. 2.

The in-wheel motor 300 is coupled to the inner part of the wheel 200 in which the tire is mounted on the driving shaft 110 to generate rotational power. In general, the in-wheel motor 300 as a technology used in a vehicle such as an electric vehicle using electricity as a power source is a technology in which power is transferred directly to the wheel 200 by a motor placed in a wheel rim 210 unlike a type in which a wheel rotates by sequential power transferring through an engine, a mission, and the driving shaft 110 in a gasoline or diesel vehicle. Therefore, when the in-wheel motor 300 is applied, driving and power transferring devices such as the engine, a transmission, or a differential gear may be omitted, and as a result, the weight of the vehicle can be reduced and energy loss during power transferring can be reduced.

In particular, in the preferred embodiment, an in-wheel motor 300 having a double rotor structure to be described below is used as the in-wheel motor 300 to further improve driving performance and reliability. This will be described below. Further, a motor housing 30 covers the exterior of the in-wheel motor 300 in order to protect the in-wheel motor 300 from infiltration of foreign materials or other impacts from the outside.

The tire is mounted on the wheel 200 which includes the rim 210 which represents a portion contacting the tire and a spoke (not shown) connecting the rim 210 and a vehicle shaft. The wheel 200 is classified into an aluminum wheel and a steel wheel according to a raw material. Since aluminum is two or three times harder than steel, aluminum has been recently used more. When aluminum and steel have the same rigidity, steel is heavier than aluminum by 2 kg or more. Moreover, centrifugal force generated while the wheel 200 rotates increases from 2 kg up to 15 to 20 kg. When the number of wheels is 4, a weight difference may be 100 kg or more depending on the wheel 200 made of aluminum or steel. As described above, the aluminum wheel has various advantages, but the aluminum wheel is not fully made of aluminum. In order to achieve better mechanical and chemical properties, an aluminum alloy in which aluminum is mixed with metal such as magnesium, silicon, titanium, and the like of approximately 5% may be used. In the preferred embodiment, depending on the user of the aluminum wheel and the steel wheel, the balance of the load of the balancing member 500 or the controller module 600 coupled to the inside of the driving shaft 110 around the fixation supporter 400 may be appropriately changed. Therefore, the eccentricity phenomenon in the coupling direction of the wheel 200 can be prevented by controlling the weight balance with the wheel 200 mounted with the tire including the in-wheel motor 300. The wheel 200 may be manufactured by using forging or press molding which is generally used.

The balancing member 500 is formed on the other driving shaft 110 in the shaft direction of the fixation supporter 400 and may be formed at a position corresponding to the wheel 200 coupled with the in-wheel motor 300. The balancing member 500 may be generally made of an injection product such as a resin and may be made of various materials for implementing a desired load. As described above, the balancing member 500 is coupled in order to balance the loads of the inner part and the outer part around the coupling location B of the fixation supporter 400 coupled with the driving shaft 110. Specifically, in order to adjust the balance with the load of the wheel assembly 100 including the in-wheel motor 300 coupled to the outer part of the coupling location of the fixation supporter 400 coupled with the driving shaft 110, the balancing member 500 will be preferably coupled to the driving shaft 110 inside the coupling location of the fixation supporter 400 with a load which is larger than or at least equal to the load of the wheel assembly 100.

As shown in FIG. 1, the apparatuses 10 of driving wheels for an in-wheel system of the preferred embodiment are connected to each other by a frame 120 connecting and supporting both fixation supporters 400. The driving shaft 110 is coupled and supported onto the fixation supporter 400 around each fixation supporter 400, the wheel 200 mounted with the tire is coupled to the outer part of the driving shaft 110 based on the coupling location B between the driving shaft 110 and the fixation supporter 400, and the controller module 600 or the balancing member 500 received in the housing 610 may be coupled to the inner part. This illustrates the wheel driving apparatus as the preferred embodiment of the present invention and is not limited to the preferred embodiment.

Figure 4:
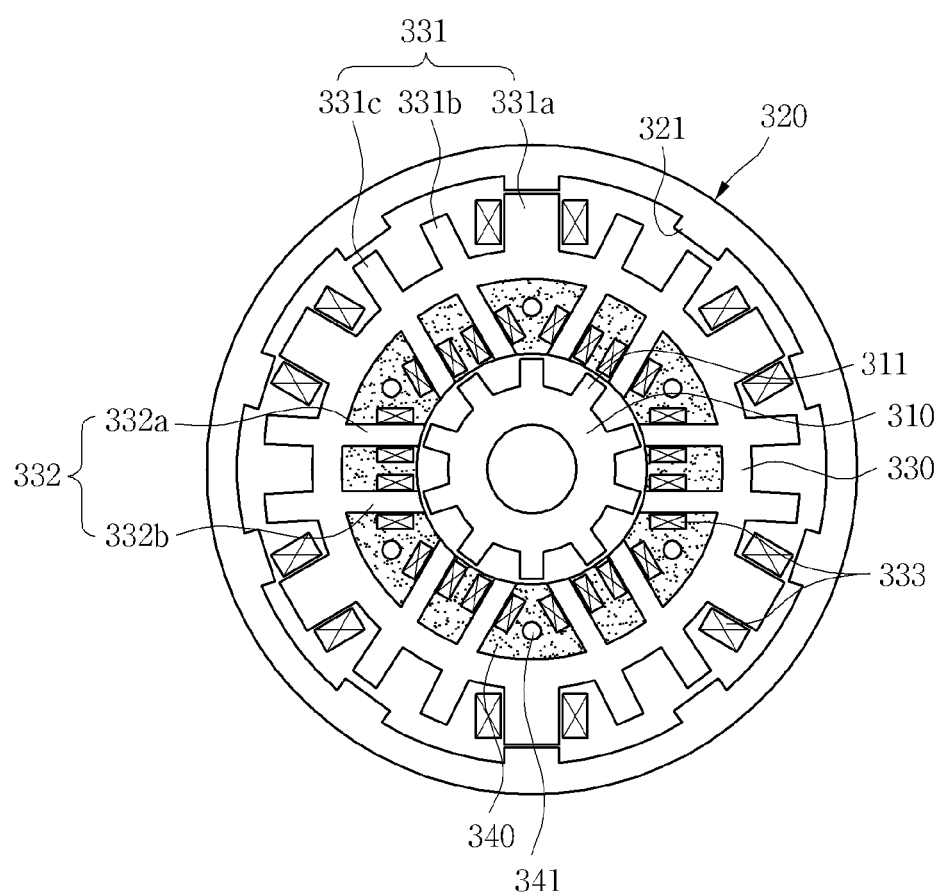
FIGS. 4 and 5 are cross-sectional views of an in-wheel motor according to the preferred embodiment.
Figure 5:
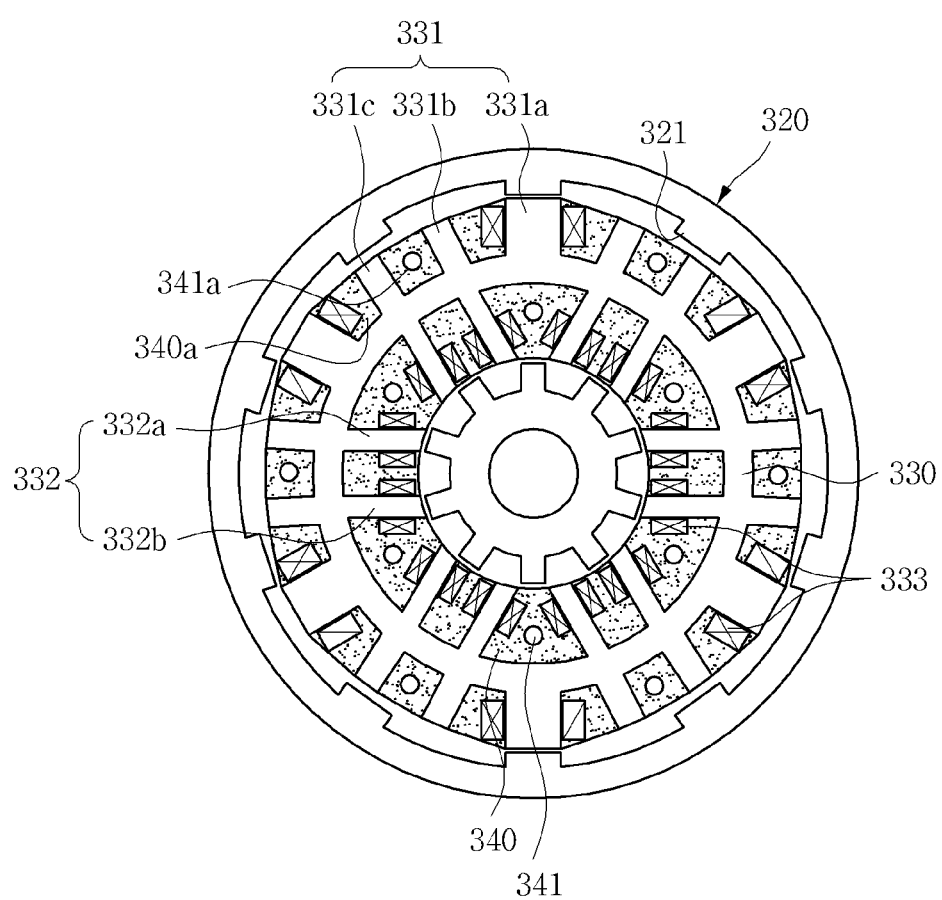
Figure 6:
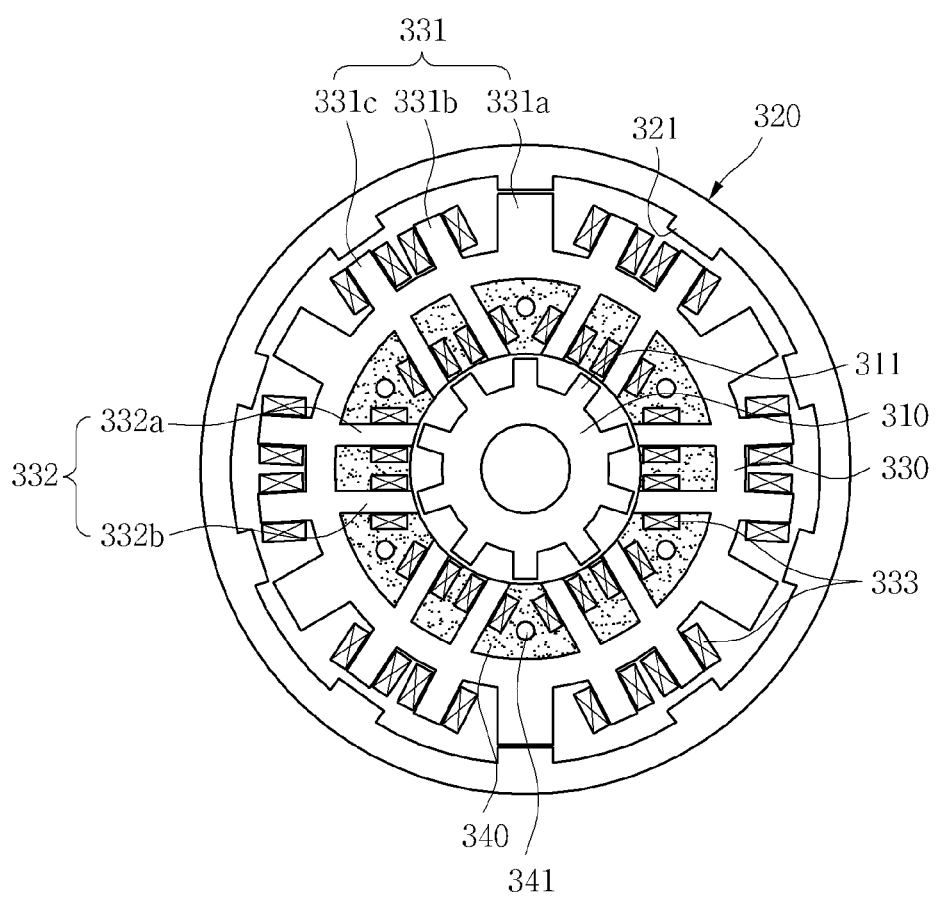
FIG. 6 is a cross-sectional view of the in-wheel motor according to the preferred embodiment depending on a change of the position of a coil wire of FIG. 4.
Figure 7:
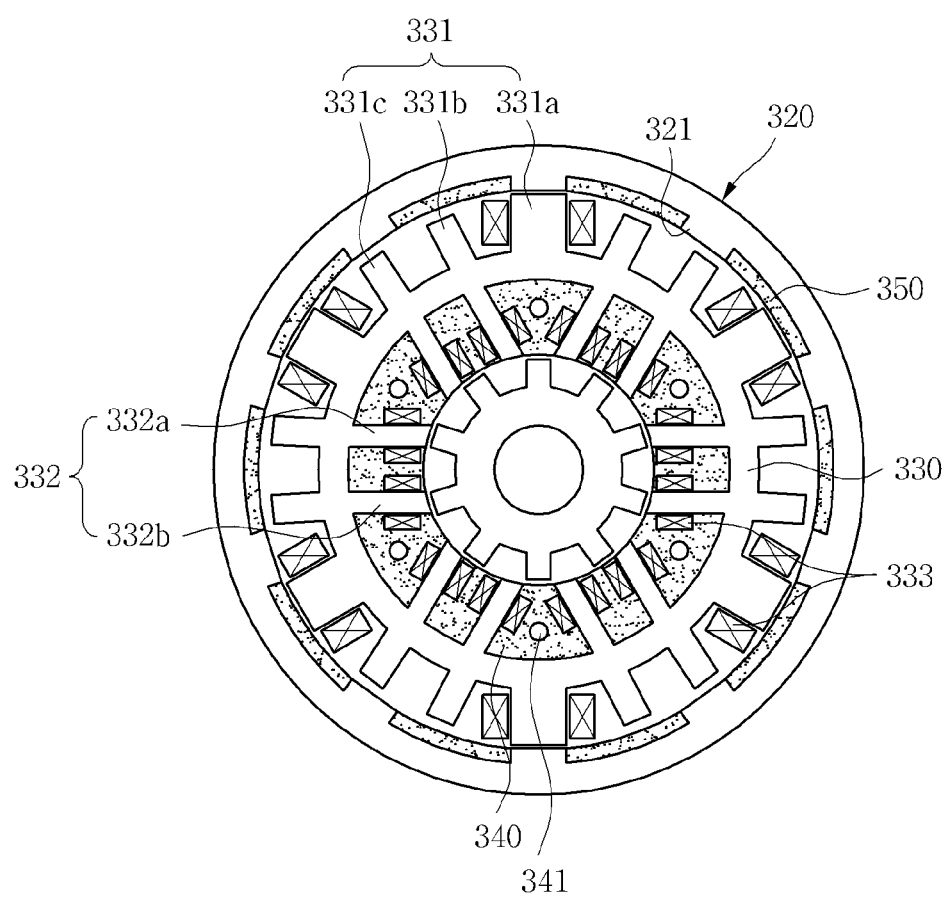
FIG. 7 is a cross-sectional view of the in-wheel motor according to the preferred embodiment including a soundproof material of FIG. 4.
Figure 8:
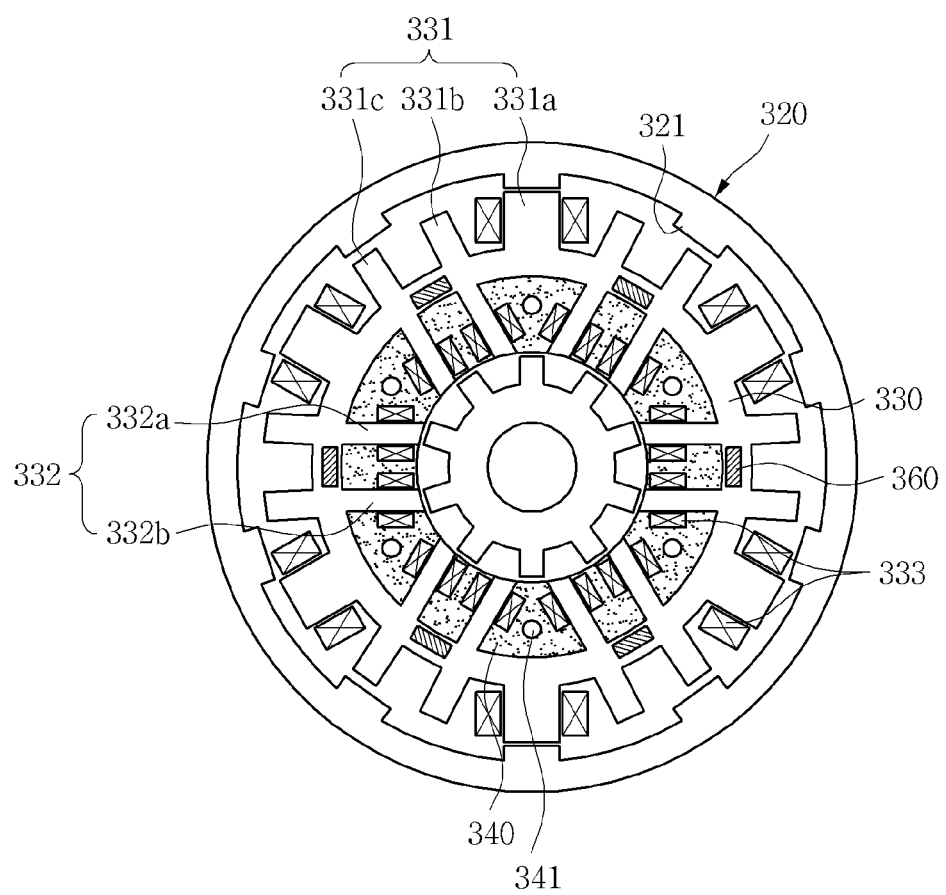
FIGS. 8 and 9 are cross-sectional views of an in-wheel motor including a magnet according to another preferred embodiment of the present invention.
Figure 9:
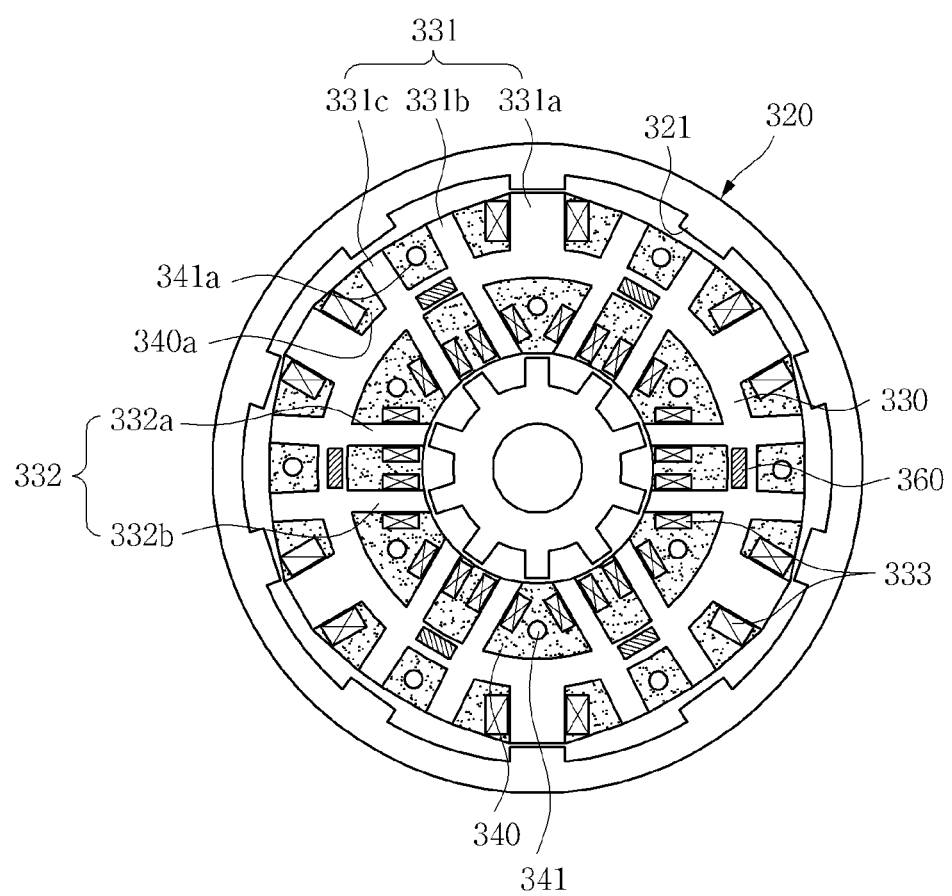

FIGS. 4 and 5 are cross-sectional views of the in-wheel motor 300 according to the preferred embodiment. FIG. 6 is a cross-sectional view of the in-wheel motor according to the preferred embodiment depending on a change of the position of a coil wire of FIG. 4. FIG. 7 is a cross-sectional view of the in-wheel motor according to the preferred embodiment including a soundproof material of FIG. 4. FIGS. 8 and 9 are cross-sectional views of an in-wheel motor including a magnet according to another preferred embodiment of the present invention.

Hereinafter, preferred embodiments of the present invention will be described in detail with reference to the accompanying drawings.

The in-wheel motor 300 of the apparatus 10 of driving wheels for an in-wheel system according to the preferred embodiment includes an out-rotor 320 having a plurality of out-rotor salient poles 321 formed at equidistance along an inner circular peripheral surface thereof, an in-rotor 310 received in the out-rotor 320 and having a plurality of in-rotor salient poles 311 formed at equidistance along an outer circular peripheral surface thereof, and a stator core 330 formed between the in-rotor 310 and the out-rotor 320 so as to face each of the in-rotor 310 and the out-rotor 320 and provided with a plurality of out-stator salient poles 331 each corresponding to the out-rotor salient poles 321 and including a main salient pole 331a, a first auxiliary salient pole 331b, and a second auxiliary salient pole 331c sequentially formed along an outer peripheral surface thereof and a plurality of in-stator salient poles 332 corresponding to the in-rotor salient poles 311 and including a first salient pole 332a and a second salient pole 332b sequentially formed along an inner peripheral surface thereof, and coils 333 are wound around the main salient pole 33a and, the first salient pole 332a and the second salient pole 332b, respectively.

The in-wheel motor 300 of the apparatus 10 of driving wheels for an in-wheel system of the preferred embodiment of the present invention is constituted by the out-rotor 320 which is an outer rotor and the in-rotor 310 which is an inner rotor and the stator core 330 is formed between the out-rotor 320 and the in-rotor 310. The stator core 330 is formed to correspond to the shapes of the in-rotor 310 and the out-rotor 320 and may generally have an annular shape. The plurality of out-stator salient poles 331 and in-stator salient poles 332 corresponding to the salient poles of the out-rotor 320 and the salient poles of the in-rotor 310 are formed along the outer peripheral surface and the inner peripheral surface of the annular stator core 330.

As shown in FIGS. 4 and 5, the plurality of out-rotor salient poles 321 are formed along the circular inner peripheral surface of the out-rotor 320 at equidistance. In the out-rotor 320 as the outer rotor that is formed in the outer part to rotate, the outer-rotor salient poles 321 are at equidistance formed in an inner direction to correspond to the out-stator salient poles 331 formed in the stator core 330 to be described below. In this case, although the out-rotor salient pole 321 is formed to face the out-stator salient pole 331, current is applied to the wound coil 333 of the out-stator salient pole 331, and as a result, the out-rotor salient poles 321 facing each other rotate in sequence to thereby rotate the out-rotor 320.

The in-rotor 310 is received in the out-rotor 320 to be rotatably placed. The plurality of in-rotor salient poles 311 which protrude may be formed along the circular outer peripheral surface of the in-rotor 310. The in-rotor salient poles 311 are at equidistance formed to correspond to the in-stator salient poles 332 of the stator core 330 to be described below. In this case, although the in-rotor salient pole 311 is formed to face the in-stator salient pole 332, current is applied to the wound coil 333 of the in-stator salient pole 332, and as a result, the in-rotors 310 rotate in sequence.

The stator core 330 is formed between the out-rotor 320 and the in-rotor 310. By considering that the out-rotor 320 and the in-rotor 310 have a circular outer shape, the stator core 330 may also have the annular shape to correspond to the annular shape. However, it is apparent to those skilled in the art that a design can be appropriately changed to the shape corresponding to the in-rotor 310 and the out-rotor 320. The out-stator salient pole 331 and the in-stator salient pole 332 corresponding to the out-rotor salient pole 321 and the in-rotor salient pole 311 formed in the out-rotor 320 and the in-rotor 310, respectively are formed in the stator core 330.

The out-stator salient poles 331 are formed along the outer peripheral surface of the stator core 330 at equidistance to protrude outward and correspond to the out-rotor salient poles 321 which protrude on the inner peripheral surface of the out-rotor 320. The out-stator salient pole 331 is constituted by the main salient pole 331a, the first auxiliary salient pole 331b, and the second auxiliary salient pole 331c and the first auxiliary salient pole 331b and the second auxiliary salient pole 331c are formed sequentially in one direction from the main salient pole 331a (in the preferred embodiment, as shown in FIG. 4, the main salient pole, the first auxiliary salient pole, and the second auxiliary salient pole are formed sequentially in a counterclockwise direction). The main salient pole 331a may have a width larger than the widths of the first auxiliary salient pole 331b and the second auxiliary salient pole 331c in a peripheral direction so that magnetic flux generated by applying current to wound coil 333 is divided into two to flow and for example, the width of the main salient pole 331a may be two times larger than the widths of the first auxiliary salient pole 331b and the second auxiliary salient pole 331c. The plurality of out-stator salient poles 331 formed as above may be sequentially placed on the stator core 330. The structure of the unit out-stator salient pole 331 has a shape of an alphabet "E" as shown in FIG. 4. The coil 333 may be wound around only the main salient pole 331a and of course, the coil 333 may be wound around only the first auxiliary salient pole 331b and the second auxiliary salient pole 331c except for the main salient pole 331a (see FIG. 6).

The plurality of in-stator salient poles 332 are formed along the inner peripheral surface of the stator core 330 at equidistance to protrude inward and correspond to the in-rotor salient poles 311 which protrude outward on the inner peripheral surface of the in-rotor 310. The in-stator salient pole 332 is constituted by the first salient pole 332a and the second salient pole 332b and has generally a pi (π) shape together with the stator core 330 connected with the first salient pole 332a and the second salient pole 332b. The first salient pole 332a and the second salient pole 332b are in parallel spaced part from each other on the stator core 330, and as a result, a magnetic flux path is shortened to reduce core loss.

As shown in FIGS. 4 and 5, the out-stator salient pole 331 and the in-stator salient pole 332 formed on the annular stator core 330 are formed to face each other as in the preferred embodiment and in particular, the first auxiliary salient pole 331b and the second auxiliary salient pole 331c of the out-stator salient pole 331 and the first salient pole 332a and the second salient pole 332b of the in-stator salient pole 332 are formed on the same line and may be formed to correspond to each other in opposite directions. Due to the structure, in a structure into which a magnet 360 to be described below is inserted, the magnet 360 can be effectively placed on a magnetic flux path formed by current applied to rotate the out-rotor 320 and a magnetic flux path formed by current applied to rotate the in-rotor 310. Through the placement, the magnet 360 is formed on the magnetic flux path to prevent magnetic force from being lost and all magnets 360 can be used concurrently.

As shown in FIG. 4, a supporting material 340 may be filled between the first salient pole 332a and the second salient pole 332b forming the in-stator salient pole 332 and among the plurality of in-stator salient poles 332. The supporting material 340 may be made of a non-magnetic body or an insulating material and the supporting material 340 is formed between the in-stator salient pole 332 to improve the rigidity of the stator. Further, vibration and noise generated while driving the motor can be reduced. In addition, as shown in FIG. 5, of course, a supporting material 340a may be formed among the out-stator salient poles 331 together.

As shown in FIG. 4, in order to dissipate high-temperature heat generated due to a high-speed operation of the motor, a cooling pipe 341 may be further formed while being inserted into the supporting material 340. The cooling pipe 341 may be formed among the unit in-stator salient poles 332 and the cooling pipe 341 may be implemented by a water cooling pipe into which water flows. Besides, it is apparent to those skilled in the art that a design is changed so that an internal forming material of the cooling pipe 341 is filled with various materials for cooling high-temperature heat. In addition, as shown in FIG. 5, of course, a cooling pipe 341a may be formed even among the supporting materials 340a formed among the out-stator salient poles 331 may be formed among the out-stator salient poles 331 together.

FIG. 7 is a diagram illustrating a state in which a soundproof material 350 is formed among the out-rotor salient poles 321 which are formed in the out-rotor 320 at equidistance. The soundproof material 350 is formed among the out-rotor salient poles 321 of the out-rotor 320 to reduce the vibration and noise when the motor is driven. The soundproof material 350 may be made of a general insulating material and is not particularly limited to the material, and as a result, if the material is a non-conductive material which may be placed among the out-rotor salient poles 321, the soundproof material 350 may be made of various materials.

FIGS. 8 and 9 are cross-sectional views of an in-wheel motor including a magnet according to another preferred embodiment of the present invention.

FIGS. 8 and 9 are diagrams illustrating a state in which the magnet is inserted into the annular stator core connecting the first salient pole and the second salient pole constituting the in-stator salient pole to each other.

Herein, as the magnet 360, a ceramic (ferrite) permanent magnet, a rate-earth permanent magnet, and an Alnico permanent magnet may he used. In particular, the rate-earth. permanent magnet includes SmCo and NdFeB. The SmCo has high residual magnetic flux density, coercivity, and energy force and has the same temperature coefficient as a demagnetization curve and the NdFeB has the residual magnetic flux density and coercivity than the SmCo.

The magnet 360 is inserted into the stator core 330 forming the path on which the magnetic flux generated by the current applied to the coil 333 flows, and as a result, magnetic force by the flow of the magnetic flux increases, thereby increasing performance and efficiency of the in-wheel motor 300.

Since a description based on the components other than the magnet 360 is duplicated with that of the in-wheel motor 330 having the double rotor structure described above, a detailed description thereof will be omitted.

According to the present invention, an eccentricity phenomenon which is caused due to inclination of a wheel and a motor in one direction of a fixation supporter can be prevented in an apparatus of driving wheels for an in-wheel system.

Further, an assembly including a controller is coupled to the other side of the fixation supporter to correspond to the wheel and the motor formed at one side around the fixation supporter to prevent the eccentricity phenomenon by the wheel and the motor.

In addition, a balance member corresponding to weights of the wheel and the motor are coupled to a driving shaft at the other side of the fixation supporter to correspond to the wheel and the motor formed at one side around the fixation supporter to maintain an overall balance, thereby improving operational reliability of the apparatus of driving wheels for an in-wheel system.

An in-wheel motor having a double rotor structure is applied to the apparatus of driving wheels for an in-wheel system to increase operational performance and efficiency.

A switched reluctance motor having the double rotor structure is applied to the in-wheel motor and a magnet is coupled onto a magnetic flux path of a stator of the in-wheel motor having the double rotor structure to further improve driving performance of the in-wheel motor.

In the in-wheel motor, the magnetic flux path is shortened through a pi (π) type in-stator salient pole structure of a stator core corresponding to a salient pole formed in an in-rotor on the double rotor structure to prevent magnetic force from being lost.

In the in-wheel motor, the magnetic flux path is shortened through an E (E) type out-stator salient pole structure of the stator core corresponding to a salient pole formed in an out-rotor on the double rotor structure to prevent the magnetic force from being lost.

Although the preferred embodiments of the present invention have been disclosed for illustrative purposes, they are for specifically explaining the present invention and thus an apparatus of driving wheels in an in-wheel system according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. An apparatus of driving wheels for an in-wheel system, comprising:
    a driving shaft which is a center of rotatable driving;
    a fixation supporter rotatably supporting the driving shaft and coupled to the driving shaft;
    an in-wheel motor coupled to an inside of a wheel having a tire mounted on the driving shaft and generating rotational power; and
    a balancing member formed on the driving shaft at a position corresponding to the wheel coupled with the in-wheel motor,
    wherein the in-wheel motor having a double rotor structure comprises
        an out-rotor having a plurality of out-rotor salient poles formed at equidistance along an inner circular peripheral surface,
        an in-rotor received in the out-rotor and having a plurality of in-rotor salient poles formed at equidistance along an outer circular peripheral surface,
        a stator core formed between the in-rotor and the out-rotor so as to face each of the in-rotor and the out-rotor, and provided with a plurality of out-stator salient poles each corresponding to the out-rotor salient poles and including a main salient pole, a first auxiliary salient pole, and a second auxiliary salient pole sequentially formed along an outer peripheral surface, and
        a plurality of in-stator salient poles corresponding to the in-rotor salient poles and including a first salient pole and a second salient pole sequentially formed along an inner peripheral surface,
        wherein coils are wound around the main salient pole and, the first salient pole and the second salient pole, respectively.

2. The apparatus of driving wheels for an in-wheel system as set forth in claim 1, wherein the balancing member is configured to have a load which is larger than or equal to the sum of loads of the wheel in which the tire is mounted on one driving shaft and the in-wheel motor coupled to the inside of the wheel.

3. The apparatus of driving wheels for an in-wheel system as set forth in claim 1, wherein the balancing member is configured to be coupled with a controller module controlling the driving of the motor.

4. The apparatus of driving wheels for an in-wheel system as set forth in claim 1, wherein the first auxiliary salient pole and the second auxiliary salient pole of the out-stator salient pole and the first salient pole and the second salient pole of the in-stator salient pole are formed to correspond to each other in opposite directions.

5. The apparatus of driving wheels for an in-wheel system as set forth in claim 4, further comprising a magnet inserted into an annular stator core connecting the first salient pole and the second salient pole constituting the in-stator salient pole to each other.

6. The apparatus of driving wheels for an in-wheel system as set forth in claim 1, further comprising a supporting material which is filled between the first salient pole and the second salient pole forming the in-stator salient pole and among the plurality of in-stator salient poles.

7. The apparatus of driving wheels for an in-wheel system as set forth in claim 6, wherein the supporting material is made of a non-magnetic body or an insulating material.

8. The apparatus of driving wheels for an in-wheel system as set forth in claim 6, further comprising a cooling pipe inserted into the supporting material and placed among the plurality of in-stator salient poles.

9. The apparatus of driving wheels for an in-wheel system as set forth in claim 1, further comprising a soundproof material formed among the plurality of out-rotor salient poles which are formed at equidistance.

10. The apparatus of driving wheels for an in-wheel system as set forth in claim 1, wherein a peripheral-direction width of the main salient pole forming the out-stator salient pole is larger than those of the first auxiliary salient pole and the second auxiliary salient pole.

11. The apparatus of driving wheels for an in-wheel system as set forth in claim 1, further comprising a motor housing covering an exterior of the in-wheel motor.

\* \* \* \* \*